United States Patent
Duveau et al.

(10) Patent No.: US 9,579,823 B2
(45) Date of Patent: Feb. 28, 2017

(54) BAG AND ITS USE TO PROVIDE ADMIXTURE FOR A HYDRAULIC COMPOSITION

(71) Applicant: LAFARGE, Paris (FR)

(72) Inventors: Vincent Duveau, Saint Andre le Gaz (FR); Philippe Thouilleux, L'isle d'abeau (FR); Alain Jacquet, Saint Didier de Formans (FR); Emmanuel Villard, Saint-christo-en-jarez (FR); Sébastien Georges, Mions (FR)

(73) Assignee: LAFARGE, Paris (FR)

( * ) Notice: Subject to any disclaimer, the term of this patent is extended or adjusted under 35 U.S.C. 154(b) by 100 days.

(21) Appl. No.: 14/349,570

(22) PCT Filed: Oct. 2, 2012

(86) PCT No.: PCT/EP2012/069466
§ 371 (c)(1),
(2) Date: Apr. 3, 2014

(87) PCT Pub. No.: WO2013/050370
PCT Pub. Date: Apr. 11, 2013

(65) Prior Publication Data
US 2014/0293728 A1 Oct. 2, 2014

(30) Foreign Application Priority Data

Oct. 4, 2011 (FR) .................................. 11 58931

(51) Int. Cl.
| | | |
|---|---|---|
| *B28C 5/00* | (2006.01) | |
| *B65D 33/00* | (2006.01) | |
| *C04B 24/00* | (2006.01) | |
| *C04B 24/26* | (2006.01) | |
| *C04B 103/00* | (2006.01) | |

(52) U.S. Cl.
CPC .............. *B28C 5/003* (2013.01); *B65D 33/00* (2013.01); *C04B 24/00* (2013.01); *C04B 24/2623* (2013.01); *C04B 2103/0077* (2013.01)

(58) Field of Classification Search
CPC .................... C04B 2103/0077; C04B 40/0633
See application file for complete search history.

(56) References Cited

U.S. PATENT DOCUMENTS

| | | | |
|---|---|---|---|
| 3,725,312 A | 4/1973 | Panzer et al. | |
| 3,738,945 A | 6/1973 | Panzer et al. | |
| 4,961,790 A * | 10/1990 | Smith ..................... B28C 5/003 | |
| | | | 106/725 |
| 5,292,441 A | 3/1994 | Chen et al. | |
| 5,393,343 A | 2/1995 | Darwin et al. | |
| 5,614,017 A | 3/1997 | Shawl | |
| 2008/0027175 A1 | 1/2008 | Bruckmann et al. | |

FOREIGN PATENT DOCUMENTS

| | | |
|---|---|---|
| EP | 0 056 627 | 7/1982 |
| EP | 2 065 349 | 6/2009 |
| EP | 2 072 531 | 6/2009 |
| FR | 1 042 084 | 10/1953 |
| JP | 58-74552 | 5/1983 |
| JP | H05-085565 | 4/1993 |
| JP | 06-270957 | 9/1994 |
| WO | WO 2004/052746 | 6/2004 |
| WO | WO 2006/032785 | 3/2006 |

OTHER PUBLICATIONS

International Preliminary Report on Patentability as issued for International Application No. PCT/EP2012/069466, dated Apr. 17, 2014.
International Search Report as issued for International Application No. PCT/EP2012/069466, dated Jan. 22, 2013.
"Water-Soluble Bags for Containing Reinforcing Steel Fibres," Research Disclosure, Mason Publications, Hampshire, GB, No. 369, Jan. 1, 1995, p. 25.
Knapen, E., et al., "Water-soluble polymers for modification of cement mortars," International Symposium Polymers in Concrete, Proceedings of ISPIC 2006, Apr. 4, 2006, pp. 85-95.

* cited by examiner

*Primary Examiner* — Tony G Soohoo
*Assistant Examiner* — Elizabeth Insler
(74) *Attorney, Agent, or Firm* — Pillsbury Winthrop Shaw Pittman LLP

(57) ABSTRACT

A bag is used to provide an admixture for a hydraulic composition, wherein a wall of the bag includes a layer, the layer including a water-soluble polymer, and wherein an admixture is present in the wall of the bag.

11 Claims, No Drawings

BAG AND ITS USE TO PROVIDE ADMIXTURE FOR A HYDRAULIC COMPOSITION

CROSS-REFERENCE TO RELATED APPLICATIONS

This is the U.S. National Stage of PCT/EP2012/069466, filed Oct. 2, 2012, which in turn claims priority to European Patent Application No. 1158931, filed Oct. 4, 2011, the entire contents of both applications are incorporated herein by reference in their entireties.

The present invention relates to a bag and its use to provide an admixture for a hydraulic composition to provide a specific function to the hydraulic composition.

Compostable bags comprising two layers of paper and an intermediate layer of a film produced from corn starch are known. However, this type of bag is only compostable under well-defined conditions and has to be treated by industrial composting plants. This type of bag does not therefore reduce the quantity of waste to be evacuated from jobsites.

Water-soluble bags for cement comprising one or more water-soluble layers and optionally comprising a layer of paper, which may disintegrate, are known. However, the main objective related to the use of this type of bags is to avoid generating waste on the production site and avoid direct contact with the cement contained in the bag. Another objective is to avoid a negative impact on the properties of the hydraulic compositions obtained when the bag is used (for example incompletely dissolved film or negative impact of the dissolution products). However, the addition of a particular function to a hydraulic composition by the bag itself has not been considered.

With few exceptions, the admixture cannot be added during the production of a hydraulic binder, such as cement. The admixtures cannot resist the high temperatures involved. The admixtures for hydraulic compositions are generally added when a hydraulic binder is mixed with water and other components of the composition. The admixtures, either in solid or liquid form, have to be stored separately. Their addition requires a separate step to measure the quantity of each admixture before it is added to the mix.

The same is true for other components of the hydraulic compositions such as the aggregates or the mineral additions, the production of which may comprise grinding steps or heating steps.

The problem which the invention seeks to solve is to provide a new means of supplying an admixture to a hydraulic binder or to other components of hydraulic compositions, for example the aggregates and the additions.

Unexpectedly, the inventors have shown that it is possible to use a bag comprising an admixture for a hydraulic composition in the wall of the bag.

The present invention seeks to provide one or more of the advantages listed below:
- the use of a water-soluble bag makes it possible to avoid problems of dust related to the handling of pulverulent materials, in particular hydraulic binders. The bags may be handled, without being opened. Consequently, the user will not need to handle the pulverulent material which could disperse very easily in the air.
- the water-soluble bags make it possible to simplify the handling of packing waste on jobsites. The bags are used in totality for the production of hydraulic compositions, so that there is no packing waste.
- the specific nature of the water-soluble bag can provide better protection of a particulate material, and in particular of hydraulic binders, against gases (for example oxygen or carbon dioxide). This improved protection makes it possible to consider longer storage times. Protection against oxygen also makes it possible to avoid aging of the compounds (chromium VI reducing agents) used to reduce chromium VI in the hydraulic binders. This makes it possible to reduce the necessary quantity of the chromium VI reducing agents.
- handling of the pulverulent materials on jobsites is improved. Handling is first of all simplified, because the water-soluble bag containing a particulate material is used as such in the concrete mixer. It is therefore no longer necessary to open the bag before use. Then, its ergonomics improve since it is no longer necessary to use a shovel to load the particulate material into the concrete mixer.
- the running and organisation of existing pre-admixture units can be improved. In existing pre-admixture units, if several different admixtures are used, it is necessary to provide separate storage means, for example silos. However, silos take up a lot of space and require technical means to handle the admixtures. In contrast, it is possible to provide several different admixtures with the bags according to the present invention. Different types of bags may be provided depending on the desired type of admixture. The presence of several silos can thus be avoided.

The invention may be used in, for example the building industry, the chemical industry (admixture suppliers), the cement industry or concrete mixing plants.

The invention relates to the use of a bag to provide an admixture for a hydraulic composition, wherein a wall of the bag comprises a layer, said layer comprising a water-soluble polymer, and wherein an admixture, preferably an admixture for a hydraulic composition, is present in the wall of the bag.

A hydraulic composition generally comprises a hydraulic binder, water, aggregates and admixtures. The aggregates include coarse aggregates and/or sand. They may be a mineral or organic material. They may also be of wood or recycled materials or with a base of waste material. A sand is generally an aggregate having a particle size less than or equal to 4 mm. Coarse aggregates are generally aggregates having a particle size greater than 4 to, for example, 20 mm.

A hydraulic binder comprises any compound which sets and hardens by hydration reactions. The hydraulic binder comprises, for example cement, plaster or hydraulic lime. Preferably, the hydraulic binder is a cement.

Preferably, a wall of the bag comprises a water-soluble polymer, said polymer comprising the or an admixture.

Preferably, the water-soluble polymer comprises a polyvinyl alcohol.

Preferably, the bag comprises an internal layer which comprises a water-soluble polymer, and an external layer which is insoluble in water.

Preferably, the bag contains cement, aggregates and/or mineral additions.

Preferably, the water-soluble polymer comprises a film-forming polymer, which has a melting temperature and/or a melt flow rate, such that at least 80% by mass of the bag dissolves after 10 minutes, more preferably after 6 minutes of mixing in a concrete mixer.

Preferably, the water-soluble polymer comprises a film-forming polymer which is a polyvinyl alcohol having a melting temperature from 155 to 185° C. and/or a melt flow rate higher than 3.0 g/10 min under 2.16 kg at 230° C. as measured according to the method described in the NFT 51-016 Standard. The principle of this method is the measurement of a mass of melted polymer, which flows through a tube of given dimensions by the action of a piston for a given length of time and at a given temperature. The tube has a length of 8.0 mm, an inside diameter of 2.096 mm and is made of tungsten carbide. The mass of the piston is 2.16 kg.

The melt flow rate of a polymer generally makes it possible to determine its extruding capacity. Generally, the higher the molar mass of the studied polymer, the lower the melt flow rate.

The present invention also relates to a bag, a wall of the said bag comprising a layer, said layer comprising a water-soluble polymer, and an admixture, preferably an admixture for a hydraulic composition, being comprised in the wall of the bag. The water-soluble polymer alone may provide the admixture, or the admixture may be dissolved or dispersed in the water-soluble polymer.

The term <<one>> is to be understood in the present description and accompanying claims as <<one or more>>.

The films of water-soluble polymer may be moulded or, preferably extruded. The extruding capacity of a polymer is generally determined by measuring the polymer's melt flow rate.

The bag used according to the invention is generally a bag the material of which is sufficiently resistant to make it possible to fill the bag with a particulate material, to handle and transport the filled bag, and at the same time have a nature and a structure such that it dissolves, disperses or disintegrates in water, preferably rapidly, during the production of a hydraulic composition. Preferably, the bag dissolves, disperses or disintegrates in water at a pH greater than or equal to 7 and by the effect of mechanical mixing. The difference between the solubility and the dispersibility is that, in the second case, small pieces of the bag remain intact (for example particles or fibres), but do not have significant negative effects when the hydraulic composition is used. A disintegratable bag is generally made of a material which loses its cohesion during the mixing.

Preferably, the bag used according to the present invention comprises one or more characteristics selected from the following list:
  sufficient mechanical properties to condition 5 to 25 kg of particulate materials;
  cold solubilisation, which is to say not requiring heating;
  solubilisation at a pH greater than or equal to 7 by the effect of a mixing action,
  sufficient water-repellency of the external layer or exterior of the bag to make the bag substantially resistant or inert to water;
  sufficient impermeability to gases, for example to oxygen in the air and to carbon dioxide. This impermeability is in particular important during the storage time of the bags, in order to reduce or limit to a maximum the degradation of the particulate materials contained in the bag.

Preferably, the bag has all the characteristics listed above.

Preferably, the dissolution of the bag takes place or is carried out in less than 70 revolutions of the blade in a concrete mixer.

Preferably, at least 80% by mass of the bag is dissolved after 10 minutes, more preferably after 6 minutes of mixing.

Preferably, the dissolution of the bag takes place or is carried out in less than five minutes, more preferably in less than four minutes of mixing.

According to one embodiment, the wall of the bag may comprise two layers. In this case the external layer and the intermediate layer described hereinafter may be joined together to form the external layer, and the internal layer may remain the same. Thus, the external layer may provide water-resistance and/or low permeability to gases, for example oxygen and/or carbon dioxide, and the internal layer may provide water-solubility and mechanical strength.

Preferably, the wall of the bag comprises three layers:
  an external layer, insoluble in water, preferably hydrophobic, to resist water (its thickness is as small as possible, for example less than or equal to 10 µm, preferably less than or equal to 5 µm);
  an intermediate layer which is not very soluble in water having low permeability to gases (for example oxygen) (its thickness is as small as possible, for example less than or equal to 20 µm);
  an internal water-soluble layer (generally thick enough to provide mechanical strength, in particular to resist handling, transport and bag filling).

When the internal water-soluble layer comprises or provides an admixture, the thickness of the layer (and hence the total quantity of water-soluble polymer) may be modified to adjust the quantity of admixture.

Preferably, the total thickness of the wall of the bag is greater than or equal to 75 µm, more preferably greater than or equal to 100 µm.

Preferably, the total thickness of the wall of the bag is less than or equal to 500 µm, more preferably less than or equal to 400 µm, most preferably less than or equal to 200 µm.

According to another embodiment, the wall of the bag may comprise a specific admixture or addition which makes it possible to decrease the thickness of the wall under 75 µm.

According to another embodiment, in addition to the two or three layers described above, the bag may comprise an additional layer of paper, preferably paper capable of disintegrating.

The bag's water-resistance may in particular be useful when placing on pallets, during transport and storage of the bags filled with particulate material. The pallets used may be damp. In addition, once completely loaded, the pallets may be covered with packing film. Condensation could occur within the pallet covered with packing film.

In order to improve the efficiency of the bag in terms of impermeability to gases, it is possible to add to the water-soluble polymer micas or other particles with a lamellar, shape, zeolites or other micronic or sub-micronic particles. In this case, the action of the said particles may depend on their size, their shape and their thickness/surface ratio.

It is possible to make the bags opaque by adding a mineral material or a pigment.

It is possible to print on the bag, for example to identify the product contained inside the bag.

According to an embodiment of the present invention, it is possible to make several small water-soluble bags and to place them inside a big bag, the big bag being preferably recyclable. In particular, this embodiment presents the advantage of a more precise dosage of the particulate materials when the entire bag is not necessary, and the possibility of keeping the un-used particulate materials for a longer time. The un-used small water-soluble bags provide better protection of the particulate material contained inside the bags, because the particulate material is not stored in the open air.

According to another embodiment of the present invention, the small water-soluble bags may be placed inside a solid container, for example a case. In particular, this embodiment presents the advantage of improved rigidity of the container, which therefore provides better protection of the bags during handling and storage.

Preferably, the water-soluble polymer further comprises a plasticizing agent for the polymer. A plasticizing agent is generally an agent modifying the mechanical properties of a polymer (for example a film-forming polymer) which may for example make a plastic film more flexible, in particular by lowering the glass transition temperature of the film-forming polymer.

Preferably, the plasticizing agent comprises glycerine or a polyethylene glycol. Preferably, the water-soluble polymer comprises up to 20% by mass of plasticizing agent.

Preferably, the water-soluble polymer may comprise polymers of different origins. The polymers may have a synthetic origin, for example polyvinyl alcohols or a natural origin, for example corn starch. According to an embodiment of the invention, the wall of the water-soluble bag further comprises an admixture making it possible to correct a possible negative effect (for example a foaming effect) of the bag's dissolution products on the hydraulic composition.

The films used for the production of the water-soluble bags are generally produced by extrusion. However, it is also possible that only the internal layer is produced by extrusion. In this case, the external layer, or the intermediate layer and the external layer, may be produced by coating or by printing on the internal layer.

The water-soluble bag may be micro-perforated to adapt to certain packing processes, including, for example, transport of cement by air flow.

The admixture used according to the invention is a product generally incorporated during the mixing of a hydraulic composition to modify the properties of the hydraulic composition in the fresh state and/or in the hardened state.

The water-soluble polymer itself may act as an admixture, or an admixture may be added. The water-soluble polymer may be a mixture of polymers wherein one or more polymers act as an admixture.

When an admixture is added, it may be dissolved or dispersed in the water-soluble polymer, for example in the form of an emulsion.

The admixture is preferably a clay-inerting agent, a plasticizer, a superplasticizer, a water-repellent (for example a stearate), an air-entraining agent, a dye, a setting accelerator, a setting retarder, a thickener, an anti-shrinking agent, an anti-foaming agent or a mixture thereof.

The admixture comprised in the wall of the water-soluble bag may be in the form of encapsulated or micro-encapsulated particles or micro-particles.

Preferably, the film-forming polymer comprised in the bag is also an admixture. It is possible to use a polymer to form the bag and to provide the or an admixture.

The admixture comprised in the wall of the bag may be water-soluble. It may be dispersed in a layer forming the bag, or may be comprised in the wall of the bag. In the second case, the admixture may, for example, be in the form of powder between two layers of the wall of the bag.

Preferably, the admixture for hydraulic compositions is an air-entraining agent, for example a polyvinyl alcohol having a hydrolysis rate less than 98%, more preferably less than 95%.

Preferably, the admixture for hydraulic compositions comprises a clay-inerting agent, for example a water-soluble polyvinyl alcohol having a viscosity less than or equal to 45 mPa·s, preferably of 8 to 45 mPa·s, measured at 20° C. in an aqueous solution comprising 4% by mass of dry extract in a Höppler viscosimeter according to the DIN 53015 Standard.

The clays are generally aluminium silicates and/or magnesium silicates, in particular phyllosilicates with a layer structure, typically spaced from approximately 7 to approximately 14 Angströms. Clays frequently found in sand may comprise in particular montmorillonite, illite, kaolinite, muscovite and chlorite. The clays may be of the 2:1 type but also of the 1:1 type (kaolinite) or the 2:1:1 type (chlorite).

Non-swelling clays are generally clays whose inter-layer space does not increase in the presence of water. Non-swelling clays comprise in particular clays of the 1:1 type (in particular kaolinite) or the 2:1:1 type (in particular chlorites).

A clay-inerting process generally comprises at least partially neutralising the deleterious effects due to the presence of clay in a hydraulic composition, in particular a hydraulic composition comprising a superplasticizer.

An example of an admixture comprised in the formulation of the water-soluble bag may be an organic molecule comprising at least two atoms each capable of forming a hydrogen bond. This molecule may in particular be a molecule adapted to reduce the adsorption of a superplasticizer with a comb structure by the non-swelling clays. In the remaining description, this organic molecule is called an inerting agent for non-swelling clays.

A hydrogen bond is generally a non-covalent physical bond of the dipole-dipole type, of low intensity (twenty times less than a typical covalent bond) and linking molecules via a hydrogen atom. It requires a donor of a hydrogen bond and an acceptor of a hydrogen bond. The donor is a compound comprising acidic hydrogen, that is to say a heteroatom (for example nitrogen, oxygen or sulphur) carrying a hydrogen atom (for example amines, alcohols or thiols). The acceptor is a heteroatom (only of nitrogen, oxygen or sulphur) carrying lone pairs.

The atom capable of forming a hydrogen bond is generally an electronegative atom, for example nitrogen, oxygen or sulphur, capable of forming at least one hydrogen bond.

Preferably, the inerting agent for non-swelling clays comprises at least ten, more preferably at least fifty, most preferably at least a hundred atoms each capable of forming a hydrogen bond.

Preferably, the inerting agent for non-swelling clays is a polymer or a co-polymer comprising at least one monomer having at least one atom capable of forming a hydrogen bond.

Preferably, the inerting agent for non-swelling clays is selected from the group consisting of an alkylene oxide (for example ethylene glycol and/or propylene glycol or PEG), a crown ether, a polyvinyl alcohol, a gluconate, a heptagluconate, a heptagluconic acid, a gluconic acid, a polysaccharide, in particular cellulose or chitin, dextrin, derivatives of cellulose, chitosan, alginates, hemicellulose, pectin, polyols or proteins or a mixture of these compounds.

Preferably, the inerting agent for non-swelling clays comprises hydroxyl functions.

Preferably, the inerting agent for non-swelling clays is a polyvinyl alcohol (PVA).

By way of example, the PVA may be obtained by a process comprising a polymerisation of at least one vinyl acetate monomer or an analogous compound and a hydrolysis step.

Preferably, the PVA has a linear structure.

Preferably, the hydrolysis rate of the PVA is less than 98%, more preferably less than 95%, most preferably less than 94%.

Preferably, the PVA has both a linear structure and a hydrolysis rate less than 98%, more preferably less than 95%, most preferably less than 94%.

It is possible to select macromolecules, in the family of PVA, making it possible to produce water-soluble films, and to efficiently inert the clay impurities, in particular the non-swelling clays, present in the sands, the coarse aggregates and in the mineral additions of the hydraulic compositions. The choice of the range of PVA may be made according to two criteria. On the one hand, the molecular weight of the PVA should be sufficient to be able to form a film having sufficient mechanical properties. On another hand, the molecular weight of the PVA should not be too high in order to retain an inerting effect, without a negative impact on the viscosity of the hydraulic composition. The molecular weight of a polymer, and in particular of the PVA, is correlated with the viscosity of an aqueous solution at 20° C. comprising 4% by mass of dry extract of this polymer. In these conditions, the PVAs are preferably such that the corresponding solution at 4% of dry extract and 20° C. has a viscosity of 8 to 45 mPa·s, more preferably 8 to 35 mPa·s. The viscosity may be measured using the Höppler viscosimeter according to the DIN 53015 Standard.

The internal layer of the bag preferably has a high cold solubility. The PVA generally comprise two types of monomeric units, that is to say monomeric units of the vinyl alcohol type and monomeric units of the vinyl acetate type. The ratio (number of vinyl alcohol monomeric units to the number of vinyl alcohol monomeric units and of vinyl acetate monomeric units) represents the rate of hydrolysis. The rate of hydrolysis should not be too substantial in the selection of PVA used in the internal layer. The rate of hydrolysis is a parameter to take into account to adjust the solubility of the film. The minimum rate of hydrolysis depends on the molecular weight of the PVA and of the composition of the film.

The PVA may also carry other types of monomeric units, for example of the hydrophobic, ionic type (anionic or cationic), or of the hydrophilic non ionic type. The external layer(s) of the bag preferably have a lower solubility in water to that of the internal layer.

According to a variant, the PVA used according to the present invention may also carry monomeric units of the ethylene type.

The PVAs used according to the present invention are preferably clay-inerting agents after solubilisation in the hydraulic composition.

Preferably, the PVAs used according to the present invention are polymers having a molecular weight less than 1000000 g/mol, more preferably less than 500000 g/mol, most preferably less than 100000 g/mol.

Swelling clays are generally clays having cations in their inter-layer spaces capable of hydrating in the presence of water (vapour or liquid). Swelling clays, generically called smectites, comprise in particular clays of the type 2:1, for example montmorillonite.

Another example of an admixture which may be used is a polymer having a density of cationic charges greater than 0.5 meq/g and an intrinsic viscosity less than 1 dl/g. Swelling clays in the sands, coarse aggregates and/or the mineral additions are thus inerted. In the following description, the cationic polymer as described above is called an inerting agent for swelling clays.

Cationicity or density of cationic charges (in meq/g) represents the quantity of charges (in mmol) carried by 1 g of polymer. This property can be measured by colloidal titration by an anionic polymer in the presence of a coloured indicator which is sensitive to the ionicity of the excess polymer.

Cationicity is determined in the following manner. 60 ml of a buffer solution of sodium phosphate is introduced in a suitable vessel at 0.001 M—pH 6 and 1 ml of a solution of o-toluidine blue at 4.1×10-4 M, then 0.5 ml of the solution of cationic polymer to be measured.

This solution is titrated with a solution of potassium polyvinyl sulphate until the colour changes. Cationicity is obtained by the following relation:

$$\text{Cationicity (meq/g)} = (V_{epvsk} * N_{pvsk})/(V_{pc} * C_{pc})$$

wherein:

$V_{pc}$ is the volume of solution of the cationic polymer;
$C_{pc}$ is the concentration of cationic polymer in solution;
$V_{epvsk}$ is the volume of solution of potassium polyvinyl sulphate; and
$N_{pvsk}$ is the normality of the solution of potassium polyvinyl sulphate.

Preferably, the inerting agent for swelling clays has a cationicity greater than 0.5 meq/g, more preferably greater than 1 meq/g, and most preferably greater than 2 meq/g.

Preferably, the inerting agent for swelling clays also has a molecular weight expressed as an intrinsic viscosity less than 1 dl/g, more preferably less than 0.8 dl/g, and most preferably less than 0.6 dl/g.

The inerting agent for swelling clays may be a polymer having a linear, comb or branched structure. Preferably, the inerting agent for swelling clays is a polymer with a linear structure or with a slightly branched structure.

The cationic groups of the inerting agent for swelling clays may in particular be phosphonium, pyridinium, sulfonium and quaternary amine groups, the latter being preferred. The inerting agent for swelling clays may be a polymer comprising a main chain and pendent side groups. These cationic groups may be located on the main chain of the inerting agent for swelling clays or on the pendent side groups.

The inerting agent for swelling clays corresponds, for example, to the cationic polymers described in Patent Application WO2006032785.

The inerting agent for swelling clays may be obtained directly by a known process of polymerisation, for example radical polymerisation, polycondensation or polyaddition.

It may also be prepared by post synthetic modification of a polymer, for example by grafting groups carrying one or more cationic functions on a polymer chain carrying appropriate reactive groups.

The polymerisation is carried out from at least one monomer carrying a cationic group or from a precursor.

The inerting agents for swelling clays obtained from monomers carrying amine and imine groups are particularly useful. Nitrogen may be quaternised after a known process of polymerisation, for example by alkylation using, for example, methyl chloride or in an acid medium by protonation.

The inerting agents for swelling clays comprising cationic groups of quaternary amine are particularly suitable.

Particular mention may be made of the following monomers already carrying a cationic quaternary amine function: ammonium diallyldialkyl salts, (meth)acrylates of quaternised dialkylaminoalkyl, and (meth)acrylamides N-substituted by a quaternised dialkylaminoalkyl.

Polymerisation may be carried out with non ionic monomers, preferably of a short chain, carrying 2 to 6 carbon atoms. Anionic monomers may also be present as long as the finally obtained polymer remains overall cationic.

Within the scope of modification of polymers by grafting, natural grafted polymers may be mentioned, for example cationic starches.

Advantageously, the inerting agent for swelling clays comprises groups which are only cationic in an acid medium. Tertiary amine groups, which are cationic by protonation in an acid medium, are particularly preferred. The absence of an ionic character in hydraulic compositions of the concrete or mortar type having an alkaline pH makes it possible to improve their robustness compared to other ionic, in particular anionic, compounds.

By way of example, cationic polymers of the family of polyvinyl amines may be mentioned. These polymers may be obtained by polymerisation of N-vinylformamide, followed by a hydrolysis. The quaternised polyvinylamines may be prepared as described in U.S. Pat. No. 5,292,441. The polymers of the polyethyleneimine type are also suitable. The latter are quaternised by protonation.

The cationic polymers obtained by polycondensation of epichlorohydrin with a mono- or dialkylamine, for example methylamine or dimethylamine, are particularly preferred Their preparation is described for example in U.S. Pat. No. 3,738,945 and U.S. Pat. No. 3,725,312.

The monomeric unit of the cationic polymer obtained by polycondensation of dimethylamine and epichlorohydrin may be represented as follows:

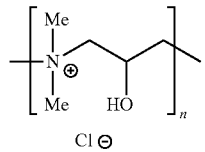

The polymers of the polyacrylamide type modified by Mannich reaction are also suitable, for example polyacrylamide N-substituted by a dimethylaminomethyl group.

The inerting agents for swelling clays obtained by polycondensation of dicyandiamide and formaldehyde are also suitable. These polymers and their synthesis are described in Patent FR 1 042 084.

According to a preferred embodiment, the inerting agent for swelling clays is obtainable by condensation of dicyandiamide with formaldehyde in the presence of:
A) a polyalkylene glycol; and/or
B) a polyalkoxylated polycarboxylate, also called PPC; and/or
C) an ammonium derivative.

The precise chemical constitution of the inerting agent for swelling clays is not known with precision. It is therefore described principally by means of its preparation process.

Another example of admixture, which may be comprised in the wall of the water-soluble bag according to the present invention is a superplasticizer.

A superplasticizer is generally an organic molecule making it possible to plasticize hydraulic compositions or reduce the dosage of water required for the same consistency of the hydraulic composition.

Preferably, the superplasticizer used according to the invention has a molecular weight less than 200000 g/mol, more preferably less than 100000 g/mol and most preferably less than 80000 g/mol.

The superplasticizer may have a linear, branched, comb or star structure.

A superplasticizer with a comb structure is particularly preferred. In this case, the main chain is generally a hydrocarbon chain.

The superplasticizer may comprise carboxylic, sulphonic, or phosphoric groups.

The superplasticizer may further contain non-ionic side groups, in particular polyether groups. The polyether groups generally comprise monomeric units of ethylene oxide or propylene oxide or a combination of the two.

The superplasticizer may also further contain side groups of the di- or oligo-saccharide type (for example as described in Patent application EP 2072531) or of the polyamine polyamide type (for example as in Patent application EP 2065349).

The superplasticizer may for example be an anionic polymer with a comb structure, for example a polycarboxylate polyoxide (PPC), a polymer comprising at least one amino-alkylene phosphonic group and at least one polyoxyalkylated chain, a polymer comprising a hydrocarbon main chain, phosphonated side groups and polyoxyalkylated side groups, or mixtures thereof.

A PPC comprises a copolymer of acrylic or methacrylic acids, and their poly(ethylene oxide) (PEO) esters.

The PPC is, preferably, a copolymer comprising at least one monomeric unit of formula (I)

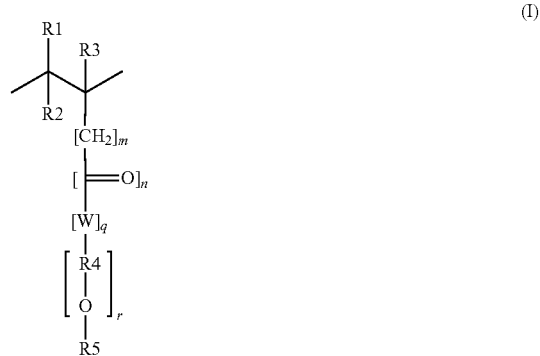

and at least one monomeric unit of formula (II)

wherein R1, R2, R3, independently represent a hydrogen atom, a linear or branched alkyl radical having 1 to 20 carbon atoms, or a phenyl radical, or a —COOR8 radical with R8 independently representing a hydrogen atom, a linear or branched alkyl radical having 1 to 4 carbon atoms or a monovalent, divalent or trivalent ion or a quaternary ammonium radical;

R4 represents a linear or branched alkyl radical having 2 to 20 carbon atoms; when there are at least two radicals R4, they may be identical or different;

R5 is a hydrogen atom or an alkyl group having 1 to 20 carbon atoms or a monovalent, divalent or trivalent ion, or a quaternary ammonium radical or R5 represents a radical of formula

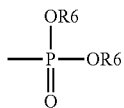

wherein the groups R6 are identical or different and represent a hydrogen atom, an alkyl group having 1 to 20 carbon atoms or a monovalent, divalent or trivalent ion, or a quaternary ammonium radical;

or R5 represents a radical of formula

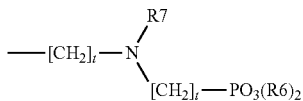

with R7 representing a hydrogen atom or an alkyl group having 1 to 18 carbon atoms, or a radical of formula

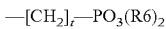

W independently representing an oxygen atom or a NH radical;

m is an integer from 0 to 2;
n is an integer equal to 0 or 1;
q is an integer equal to 0 or 1;
r is an integer from 0 to 500;
t is an integer from 0 to 18;
and the molar mass of said copolymer is from 10 000 to 400 000 daltons.

The integer m of monomeric units (I) and the integer m of monomeric units (II) are independent and can be identical or different.

The integers t of the radical R5 of the monomeric unit (I) may be identical or different.

The radicals R1, R2, R3 and R4 (I) and W of the monomeric unit (II) are independent and may be identical or different.

Preferably, a radical R1 is a hydrogen atom.
Preferably, a radical R2 is a hydrogen atom.
Preferably, a radical R3 is a methyl radical.
Preferably, a radical R4 is an ethyl radical.
Preferably, the copolymer used according to the present invention or a salt thereof has an integer r from 1 to 300, more preferably from 20 to 250, even more preferably from 40 to 200, most particularly from 40 to 150.

The copolymer may comprise several different monomeric units according to formula (I) in particular having different radicals R5.

The superplasticizer may be prepared by applying or adapting known methods. A considerable number of superplasticizers as described are known per se. They may be obtained directly by copolymerisation, a method described in Patents EP 0056627, JP 58074552, U.S. Pat. No. 5,393, 343.

They may also be prepared by post-synthetic modification of a polymer, as described for example in U.S. Pat. No. 5,614,017.

Another example of admixture which may be comprised in the wall of the water-soluble bag according to the present invention may be an air-entraining agent.

An air-entraining agent is generally a molecule having surfactant properties. For example, it is possible to use a film-forming polymer of the polyvinyl alcohol type (PVA) having surfactant properties.

Preferably, the air-entraining agent comprises a water-soluble PVA having a hydrolysis rate less than 98 more preferably less than 95%.

Preferably, the content of the bag used according to the invention is a particulate material.

Preferably, the particulate material is a hydraulic binder, aggregates, a mineral addition or mixtures thereof. The particulate material may be a hydraulic binder, aggregates or a mineral addition. Preferably, the particulate material is a hydraulic binder, for example a cement.

The present invention also relates to a process for the production of a hydraulic composition comprising water, aggregates and a hydraulic binder, using a bag, wherein a wall of the bag comprises a layer comprising a water-soluble polymer and wherein an admixture, preferably an admixture for a hydraulic composition, is present in the wall of the bag.

The present invention also relates to a process for the production of a hydraulic composition comprising the following steps:

a. introduction of water and aggregates in a concrete mixer;
b. introduction of a hydraulic binder; and
c. optionally introduction of mineral additions and/or other admixtures;

in which a bag is introduced during step a and/or during step b and/or during step c, a wall of the bag comprising a layer which comprises a water-soluble polymer and an admixture, preferably an admixture for a hydraulic composition, being present in the wall of the bag.

According to a feature of the invention at least one part of the aggregates in step a and/or at least one part of the hydraulic binder in step b and/or at least one part of the mineral additions in step c is contained in the bag.

According to a further feature of the invention the water-soluble bag is added during step a. Preferably, at least one part of the aggregates in step a is contained in the water-soluble bag. Preferably, the totality of the aggregates in step a is contained in the water-soluble bag.

According to a further feature of the invention the water-soluble bag is added during step b. Preferably, at least one part of the hydraulic binder in step b is contained in the water-soluble bag. Preferably, the totality of the hydraulic binder in step b is contained in the water-soluble bag.

According to a further feature of the invention the water-soluble bag is added during step c. Preferably, at least one part of the mineral additions in step c is contained in the water-soluble bag. Preferably, the totality of the mineral additions in step c is contained in the water-soluble bag.

According to a further feature of the invention in the process, a water-soluble bag is added during step a and during step b.

According to a further feature of the invention in the process, a water-soluble bag is added during step a and during step c.

According to a further feature of the invention in the process, a water-soluble bag is added during step b and during step c.

According to a further feature of the invention in the process, a water-soluble bag is added during step a, during step b and during step c.

The hydraulic composition obtained by following the process makes it possible to produce elements for the construction field.

Shaped articles for the construction field generally comprise any constituting element of a construction, for example a floor, a screed, a foundation, a wall, a partition wall, a ceiling, a beam, a work top, a pillar, a bridge pier, a concrete block, a pipeline, a post, a cornice, an element of road works (for example a border of a pavement), a tile, for example a roof tile, a surfacing (for example of a wall), a plaster board, an (acoustic and/or thermal) insulating element.

Preferably, the content of the bag used according to the invention comprises a particulate material, more preferably a hydraulic binder, aggregates or a mineral addition, most preferably a hydraulic binder. According to a feature of the invention, the contents of the bag may be a hydraulic binder and/or aggregates and/or a mineral addition.

A hydraulic composition is generally a mix of a hydraulic binder, with water (called mixing water), optionally aggregates, optionally additives, and optionally mineral additions. A hydraulic composition may for example be a high performance concrete, very high performance concrete, self-placing concrete, self-levelling concrete, self-compacting concrete, fibre concrete, ready-mix concrete, pervious concrete, insulating concrete, accelerated concrete or coloured concrete. The term <<concrete>>, is also to be understood as concretes which have been submitted to a finishing operation, for example bush-hammered concrete, exposed or washed concrete or polished concrete. Pre-stressed concrete is also to be understood by this definition. The term <<concrete>> comprises mortars, in this specific case concrete comprises a mix of a hydraulic binder, sand, water, optionally additives and optionally mineral additions. The term <<concrete>> comprises fresh concrete or hardened concrete. Preferably, the hydraulic composition according to the present invention is a cement slurry, a mortar, a concrete, a plaster paste or a slurry of hydraulic lime. Preferably, the hydraulic composition is a cement slurry, a mortar or a concrete. The hydraulic composition may be used directly on jobsites in the fresh state and poured into formwork adapted to the target application, or at a pre-cast plant, or used as a coating on a solid support.

The mineral additions are generally finely divided materials used in the hydraulic compositions (for example, concrete) of the hydraulic binders (for example, a cement) in order to improve certain properties or to provide them with particular properties. They may be, for example, fly ash (for example, as defined in the <<Cement>> NF EN 197-1 Standard, paragraph 5.2.4 or as defined in the EN 450 <<Concrete>> Standard), pozzolanic materials (for example, as defined in the <<Cement>> NF EN 197-1 Standard of February 2001, paragraph 5.2.3), silica fume (for example, as defined in the <<Cement>> NF EN 197-1 Standard, of February 2001, paragraph 5.2.7 or as defined in the prEN 13263 <<Concrete>> Standard: 1998 or the NF P 18-502 Standard), slag (for example, as defined in the <<Cement>> NF EN 197-1 Standard, paragraph 5.2.2 or as defined in the NF P 18-506 <<Concrete>> Standard), calcined shale (for example, as defined in the <<Cement>> NF EN 197-1 Standard, of February 2001, paragraph 5.2.5), limestone additions (for example, as defined in the <<Cement>> NF EN 197-1 Standard, paragraph 5.2.6 or as defined in the NF P 18-508 <<Concrete>> Standard) and siliceous additions (for example, as defined in the NF P 18-509 <<Concrete>> Standard) or mixtures thereof.

The present invention also relates to a bag, wherein a wall of the bag comprises a layer comprising a water-soluble polymer and wherein an admixture, preferably an admixture for a hydraulic composition, is present in the wall of the bag.

Measurement of the Intrinsic Viscosity of a Polymer

The intrinsic viscosity is generally the limit value of the reduced viscosity of the polymer at infinite dilution. This value is correlated with the average molecular weight of a polymer.

Measurements of the intrinsic viscosity of polymers are carried out in a solution of NaCl 3 M, using a capillary viscosimeter of the Ubbelhode type, at 25° C.

The flowing time was measured in the capillary tube between two marks, for the solvent and for the solutions of the polymer at different concentrations. The specific viscosity was obtained for each concentration, by dividing the difference between the flowing times of the solution of polymer and of the solvent, by the flowing time of the solvent. The reduced viscosity was calculated by dividing the specific viscosity by the concentration of the solution of polymer. By tracing the value of the reduced viscosity as a function of the concentration of the solution of polymer, a straight line was obtained. The intersection of this straight line with the y axis corresponded to the intrinsic viscosity for a concentration equal to zero.

In the present specification, including the accompanying claims, unless otherwise specified, percentages are by mass.

EXAMPLES

Raw Materials

The following materials were used in the following examples:
Cement: cement of type CEM I 52.5 N CE CP2 NF (from Le Havre-Lafarge plant).
Limestones:
  Limestone 1: limestone which comprises approximately 90% by mass passing through the 100 μm sieve (Supplier: OMYA; brand name: Betocarb HP Entrain);
  Limestone 2: limestone which comprises approximately 90% by mass passing through the 100 μm sieve (Supplier: OMYA; brand name: Betocarb HP Erbray).
Clays:
  Clay 1: Montmorillonite from Sardinia (Supplier: Socodis; brand name: MCC3);
  Clay 2: Illite from Le Puy (Supplier: Socodis);
  Clay 3: Kaolinite (Supplier: AGS; brand name: BS3).
Aggregates: the materials from the following list were used (the ranges of aggregates are given in the list in the form of d/D wherein <<d>> and <<D>> are as defined in the XPP 18-545 Standard):
  Sand 1: siliceous sand with a diameter less than or equal to 0.315 mm (Supplier: Fulchiron; brand name: PE2LS);
  Sand 2: 0/1 rounded siliceous sand from the St Bonnet quarry; (Supplier: Lafarge);
  Sand 3: 0/5 rounded siliceous sand from the St Bonnet quarry; (Supplier: Lafarge);
  Standardized sand: siliceous sand conforming with the EN 196-1 Standard (Supplier: Société Nouvelle du Littoral);
  Coarse aggregate: 5/12 rounded siliceous aggregate from the St Bonnet quarry; (Supplier: Lafarge); and
  Coarse aggregate 2: 12/20 siliceous aggregate from the St Bonnet quarry; (Supplier: Lafarge).
Superplasticizer:
  SP: polycarboxylate superplasticizer (Supplier: Chryso; brand name: Optima 206).

Thermoplastic polyvinyl alcohols (PVA):
- PVA-1: PVA having a melting temperature of 159° C. and a melt flow index from 13.0 to 19.0 g/10 min under 2.16 kg at 190° C. (Supplier: Kuraray; brand name: LP TC 251);
- PVA-2: PVA having a melting temperature of 182° C. and a melt flow index from 3.5 to 4.5 g/10 min under 2.16 kg à 230° C. (Supplier: Kuraray; brand name: LP TC 661);
- PVA-3: PVA having a viscosity of 4.0 mPa·s and a hydrolysis rate of 88%; solution having 9.3% of PVA by dry mass and 1% of anti-foaming agent by mass relative to the PVA (Supplier: Air Product; brand name: Surfynol MD20);
- PVA-4: PVA having a viscosity of 40.0 mPa·s and a hydrolysis rate of 88%; solution having 3.8% of PVA by dry mass and 1% of anti-foaming agent by mass relative to the PVA (Supplier: Air Product; brand name: Surfynol MD20);
- PVA-5: PVA having a viscosity of 23.0 mPa·s and a hydrolysis rate of 88% (Supplier: Kuraray);

Example 1

Measurement of the Dissolution of a Film of Polymer in a Mortar

Measurement of the dissolution was carried out on an equivalent microconcrete, the formula of which is given in Table 1 below.

TABLE 1

Formula of mortar for Example 1

| Components | Mass (g) |
|---|---|
| Cement | 479.7 |
| Limestone 1 | 358.8 |
| Standardized sand | 1350 |
| Sand 1 | 200 |
| Total water | 324.4 |
| SP | 2.88 |

The tested PVA films were bought directly in the form of films produced by extrusion. The PVA films were cut into square pieces, 8.9 cm by 8.9 cm, for the dissolution tests.

TABLE 2

Mixing procedure

| Start time | Final time | Actions |
|---|---|---|
| 0:00 | 0:30 | Add 93 g of pre-wetting water and sands whilst stirring at low speed (140 rpm) |
| 0:30 | 1:00 | Mix at low speed |
| 1:00 | 5:00 | Leave to rest |
| 5:00 | 6:00 | Add the cement, the Limestone 1 and the PVA film, and mix at low speed |
| 6:00 | 6:30 | Add the mixing water (231.4 g) whilst stirring at low speed |
| 6:30 | 8:00 | Mix at low speed |
| 8:00 | 9:00 | Add the SP and mix at low speed |
| 9:00 | 10:00 | Mix at high speed (280 rpm) |
| 10:00 | | Measure the spread |
| 12:00 | 14:00 | Mix at high speed |
| 15:00 | | Measure the spread |

The batches were made in a Perrier mixer.

The spread measurement was carried out in a truncated bottomless mould, which is a reproduction at the scale ½ of the Abrams cone (refer to the NF P 18-451 Standard of 1981):

Top diameter: 50+/−0.5 mm;
Bottom diameter: 100+/−0.5 mm;
Height: 150+/−0.5 mm.

The other equipment required for this measurement was a glass plate and a steel rod with a spherical tip having a diameter of 6 mm and a length of 300 mm.

The procedure for the spread measurement was the following:
- place the cone on the glass plate;
- fill the cone in three layers of identical volumes and tap the mortar 15 times with the rod between each layer;
- level the top surface of the cone;
- lift the cone vertically;
- measure the spread, that is to say, the diameter of the obtained disc of mortar, according to four diameters at 45° using a calliper square.

The result of the spread measurement was the average of the four obtained values.

After the last spread measurement the mortar was placed in a bucket filled with cold water. The mix was stirred using a big spoon, then the supernatant was passed through a 2 mm sieve. The operation was renewed four times. The quantity of PVA film remaining on the sieve was then determined. The results are given in Table 3 below.

TABLE 3

Results of the dissolution of two PVAs in a mortar

| PVA | Evaluation of the dissolution |
|---|---|
| PVA-1 | 100% dissolution |
| PVA-2 | 95 to 98% dissolution |

According to Table 3 hereinabove, the tested PVAs (PVA-1 and PVA-2) dissolved satisfactorily in the mortar (more than 80% dissolution).

Example 2

Inerting Tests with PVAs

The inerting performances of two PVAs (PVA-3 and PVA-4) were evaluated from the mortar spread values with or without the presence of clay. Clay inerting agents generally make it possible to at least partially neutralise deleterious effects due to the presence of clay in a hydraulic composition, in particular on the superplasticizers.

Table 4 below, lists the formulae of the tested mortars.

TABLE 4

Formulae of tested mortars for Example 2

| Components | Test 1 Mass (g) | Test 2 Mass (g) | Test 3 Mass (g) | Test 4 Mass (g) |
|---|---|---|---|---|
| Cement | 480.0 | 480.0 | 480.0 | 480.0 |
| Limestone 2 | 359.0 | 359.0 | 359.0 | 359.0 |
| Standardized sand | 1350.0 | 1350.0 | 1350.0 | 1350.0 |
| Sand 1 | 200 | 169 | 169 | 169 |
| Clay 1 | 0.0 | 10.3 | 10.3 | 10.3 |
| Clay 2 | 0.0 | 10.3 | 10.3 | 10.3 |
| Clay 3 | 0.0 | 10.3 | 10.3 | 10.3 |
| Pre-wetting water | 100.8 | 100.8 | 22.5 | 70.5 |
| Mixing water | 222.1 | 222.1 | 222.1 | 222.1 |
| SP | 4.5 | 4.5 | 4.5 | 4.5 |
| PVA (in the form of a solution) | 0.0 | 0.0 | 81.4 (PVA-4) | 33.3 (PVA-3) |

The procedure for the production of the mortar is given in Table 5 below.

TABLE 5

Procedure for production of the mortar for Example 2

| Start time | Final time | Actions |
|---|---|---|
| 0:00 | 0:30 | Add 93 g of pre-wetting water and sands whilst stirring at low speed (140 rpm) |
| 0:30 | 1:00 | Mix at low speed |
| 1:00 | 5:00 | Leave to rest |
| 5:00 | 6:00 | Add the cement, the Limestone 2 and Clays, and mix at low speed |
| 6:00 | 6:30 | Add the mixing water (231.4 g) and PVA whilst stirring at low speed |
| 6:30 | 8:00 | Mix at low speed |
| 8:00 | 9:00 | Add the SP and mix at low speed |
| 9:00 | 10:00 | Mix at high speed (280 rpm) |
| 10:00 | | Measure the spread |
| 12:00 | 30:00 | Mix at high speed |
| 30:00 | | Measure the spread |

The spread measurements were carried out at 10 minutes and 30 minutes following the same procedure as for Example 1. The density was measured at 10 minutes from the specific gravity determined according to the procedure described below in Example 3.

Table 6 below gives the results.

TABLE 6

Results of the inerting tests

| Test | Spread at 10 min (mm) | Spread at 30 min (mm) | Density at 10 min |
|---|---|---|---|
| 1 | 360 | 380 | 2.28 |
| 2 | 165 | 110 | — |
| 3 | 255 | 230 | 2.28 |
| 4 | 325 | 280 | 2.28 |

According to Table 6 hereinabove, when comparing Test 1 with Test 2, the addition of clay without PVA had a negative impact on the spread and rheological retention. The spread at 10 minutes did decrease from 360 mm to 165 mm. Furthermore, the spread between 10 and 30 minutes for Test 1 increased by 20 mm, whilst the spread between 10 and 30 minutes for Test 2 decreased by 55 mm.

The spread at 10 minutes improved in Test 3 (presence of PVA-4) with 255 mm compared to Test 2 (absence of PVA) with 165 mm. The spread loss between 10 and 30 minutes was only 25 mm for Test 3. In contrast, it should be noted that the value of 255 mm spread at 5 minutes was good. The spread at 10 minutes improved in Test 4 (presence of PVA-3) with 325 mm compared to Test 2 (absence of PVA) with 165 mm. The spread loss in Test 4 between 10 and 30 minutes was 45 mm, but the spread at 30 minutes was 280 mm, which is a satisfactory value.

Example 3

Air-Entrainment Tests with PVAs

The air-entraining performance of a PVA (PVA-5) was evaluated.
The formula of the micro concrete on which the tests were carried out was the same as the formula in Example 1 (see Table 1).

Table 7 below, provides the densities for each of the constituents of the tested mortar.

TABLE 7

Determination of the density of each of the constituents of the tested mortar in Example 3.

| Components | Mass (g) | Volume (ml) | Density |
|---|---|---|---|
| Cement | 479.7 | 152.29 | 3.15 |
| Limestone 1 | 358.8 | 131.43 | 2.73 |
| Standardized sand | 1350 | 509.43 | 2.65 |
| Sand 1 | 200 | 74.88 | 2.67 |
| Total water | 324.4 | 319.17 | 1.02 |
| SP | 2.88 | — | — |

The production procedure of the mortar is given in Table 8 below.

TABLE 8

Production procedure of the mortar for Example 3

| Start time | Final time | Actions |
|---|---|---|
| 0:00 | 0:30 | Add 93 g of pre-wetting water and sands whilst stirring at low speed (140 rpm) |
| 0:30 | 1:00 | Mix at low speed |
| 1:00 | 5:00 | Leave to rest |
| 5:00 | 6:00 | Add the cement, the Limestone 1 and mix at low speed |
| 6:00 | 6:30 | Add the mixing water (231.4 g) and PVA whilst stirring at low speed |
| 6:30 | 8:00 | Mix at low speed |
| 8:00 | 9:00 | Add the SP and mix at low speed |
| 9:00 | 10:00 | Mix at high speed (280 rpm) |
| 10:00 or 30:00 | | Measure the spread and the density |

The spread measurement procedure was the same procedure as the one described in Example 1.

The principle of the entrained air measurement was the following. It was possible to calculate the theoretical density of the mortar without air when knowing the density of each of the mortar's constituents (see Table 7). The density of the mortar comprising a PVA was measured following the procedure described hereinafter. It was possible to deduce the quantity of entrained air by calculating the difference between the measured density and the theoretical density.

The measurement procedure of the entrained air was the following:
slowly pour mortar in a 732-ml plastic beaker of known mass;
gently tap the bottom of the beaker on the work top to settle the mortar as it is poured;
add a slight excess of mortar;
level the mortar using a metal ruler;
wipe the edges of the beaker and weigh it;
deduce the density, then the percentage of air for comparisons between the theoretical density and the measured density.

The obtained results are given in Table 9 below.

TABLE 9

Results of the measurements of entrained air with PVA

| | PVA/ Cement (ppm) | Spread at 10 minutes (mm) | Spread at 30 minutes (mm) | Entrained air/mortar at 10 minutes (mass %) |
|---|---|---|---|---|
| PVA-5-1 | 0 | 320 | 289 | 0.86 |
| PVA-5-2 | 100 | 335 | 302 | 6.88 |

TABLE 9-continued

Results of the measurements of entrained air with PVA

| | PVA/ Cement (ppm) | Spread at 10 minutes (mm) | Spread at 30 minutes (mm) | Entrained air/mortar at 10 minutes (mass %) |
|---|---|---|---|---|
| PVA-5-3 | 200 | 338 | 331 | 5.6 |
| PVA-5-4 | 500 | 339 | 319 | 9.29 |
| PVA-5-5 | 1000 | 312 | 313 | 16.01 |

According to Table 9 hereinabove, PVA-5 gave satisfactory values of entrained air. For an addition of 100 ppm of PVA-5, the obtained mortar had 6.88% of entrained air.

Example 4

Tests with Water-Soluble Bags

Water-soluble bags were produced by thermal welding using films of PVA-1. Three thicknesses of film were tested (Bag-1: 100 μm, Bag-2: 75 μm and Bag-3: 50 μm).

45 liters of concrete were produced in a concrete mixer. The formulation of the concrete was reported in Table 10 below. The production procedure of the concrete was reported in Table 11 below.

A control concrete was produced without a bag of PVA. The other concretes (Concrete-1, Concrete-2 and Concrete-3) were produced from Bag-1, from Bag-2 and from Bag-3 respectively, comprising 13.51 kg of Cement.

TABLE 10

Formulation of concrete for Example 4

| Materials | Quantity for 45 L (kg) |
|---|---|
| Cement | 13.51 |
| Sand 1 | 3.76 |
| Sand 2 | 18.09 |
| Sand 3 | 20.55 |
| Coarse aggregates 1 | 8.67 |
| Coarse aggregates 2 | 32.71 |
| Total water | 8.24 |
| including the pre-wetting water | 3.37 |
| including the mixing water | 4.87 |

TABLE 11

Production procedure of the concrete for Example 4

| Start time | Final time | Action |
|---|---|---|
| | | Put the sands and aggregates in a concrete mixer. |
| 0 | 0 min 30 | Start up the concrete mixer at 20 rpm and add the pre-wetting water. |
| 0 min 30 | 1 min 00 | Mix at 20 rpm. |
| 5 min 00 | 6 min 00 | Add the cement or the bag of cement and mix at 20 rpm. |
| 6 min 00 | 6 min 30 | Add the mixing water |
| 6 min 30 | 12 min 00 | Mix at 20 rpm. |

A—Mechanical Loading and Handling Resistance of the Bags

The three bags (Bag-1, Bag-2 and Bag-3) were manually loaded with 13.51 kg of cement and were handled in a typical manner (lift, carry and lay).

Bag-1, which had a thickness of 100 μm, was the most satisfactory in terms of its mechanical resistance to loading and handling. The bag was not torn.

Bag-2, which had a thickness of 75 μm, resisted to the test without being torn, but appeared to be near the tearing point. It was nevertheless considered to be satisfactory.

Bag-3, which had a thickness of 50 μm and a single layer was not thick enough to bear 13.51 kg of cement. The film was found to have stretched.

B—Concrete Spreads and Entrained Air

The concretes obtained by following the procedure in Table 11 hereinabove were tested for their spread and their quantity of entrained air. The spread was measured according to the procedure described in the above examples. The quantity of entrained air was measured with a concrete air meter (Supplier: Controlab). The results were given in Table 12 below.

TABLE 12

Results in terms of spread and entrained air for Example 4

| Concrete | Spread at 15 min (cm) | Spread at 30 min (cm) | Entrained air (mass %) |
|---|---|---|---|
| Control | 17.5 | 13.5 | 1.60 |
| Concrete-1 | 20.0 | 16.0 | 5.85 |
| Concrete-2 | 19.5 | 18.0 | 4.80 |
| Concrete-3 | 19.0 | 16.5 | 4.25 |

According to Table 12 hereinabove, the three tested bags made it possible to improve the spread and the quantity of entrained air of the concretes.

Moreover, the three bags dissolved in a satisfactory manner during mixing in the concrete mixer.

The invention claimed is:

1. A method comprising utilizing a bag to provide an admixture for a hydraulic composition, wherein a wall of the bag comprises a layer, said layer comprising a water-soluble polymer, the water-soluble polymer comprising a film-forming polymer which is a polyvinyl alcohol having a melting temperature from 155 to 185° C. and a melt flow rate higher than 3.0 g/10 min under 2.16 kg at 230° C. as measured according to the method described in the NFT 51-016 Standard, and wherein the admixture for the hydraulic composition is present in the wall of the bag.

2. The method according to claim 1, wherein the wall of the bag comprises the or another water-soluble polymer which comprises the or another admixture.

3. The method according to claim 1, wherein the bag comprises an internal layer which comprises a water-soluble polymer, and an external layer which is insoluble in water.

4. The method according to claim 1, wherein the bag contains cement, aggregates and/or mineral additions.

5. The method according to claim 1, wherein the film-forming polymer has a melting temperature and/or a melt flow rate such that at least 80% by mass of the bag dissolves after 10 minutes of mixing in a concrete mixer.

6. The method according to claim 1, wherein the admixture comprises a clay-inerting agent.

7. The method according to claim 6, wherein the clay-inerting agent comprises a water-soluble polyvinyl alcohol having a viscosity of 8 to 45 mPa·s measured at 20° C. in an aqueous solution comprising 4% by mass of dry extract in a Hoppler viscosimeter according to the DIN 53015 Standard.

8. The method according to claim 1, wherein the admixture comprises an air-entraining agent.

9. The method according to claim 8, wherein the air-entraining agent comprises a water-soluble polyvinyl alcohol having a hydrolysis rate less than 98%.

10. A process for the production of a hydraulic composition comprising water, aggregates and a hydraulic binder, wherein a bag as described in claim 1 is used.

11. A bag to provide an admixture for a hydraulic composition, the bag comprising a wall that comprises a layer, said layer comprising a water-soluble polymer, the water-soluble polymer comprising a film-forming polymer which is a polyvinyl alcohol having a melting temperature from 155 to 185° C. and a melt flow rate higher than 3.0 g/10 min under 2.16 kg at 230° C. as measured according to the method described in the NFT 51-016 Standard, and wherein the admixture for the hydraulic composition is present in the wall of the bag.

* * * * *